United States Patent
Siegel

(10) Patent No.: US 6,196,812 B1
(45) Date of Patent: Mar. 6, 2001

(54) PUMP UNIT FOR A HYDRAULIC BRAKE SYSTEM

(75) Inventor: Heinz Siegel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/424,644

(22) PCT Filed: Dec. 29, 1998

(86) PCT No.: PCT/DE98/03806

§ 371 Date: Nov. 26, 1999

§ 102(e) Date: Nov. 26, 1999

(87) PCT Pub. No.: WO99/49215

PCT Pub. Date: Sep. 30, 1999

(30) Foreign Application Priority Data

Mar. 26, 1998 (DE) ............................................. 198 13 301

(51) Int. Cl.[7] ................................................... F04B 17/00
(52) U.S. Cl. ......................... 417/360; 417/415; 384/536
(58) Field of Search .................................. 417/360, 415; 384/536

(56) References Cited

U.S. PATENT DOCUMENTS

| | | | |
|---|---|---|---|
| 3,813,826 | * 6/1974 | Bando | 451/342 |
| 4,412,707 | * 11/1983 | Buffet | 384/606 |
| 4,925,408 | * 5/1990 | Webb et al. | 440/38 |
| 5,620,311 | * 4/1997 | Wetzel | 417/415 |
| 5,839,349 | * 11/1998 | Volz | 92/147 |
| 5,895,207 | * 4/1999 | Burgdorf et al. | 417/410.1 |

* cited by examiner

Primary Examiner—Charles G. Freay
Assistant Examiner—Robert Z. Evora
(74) Attorney, Agent, or Firm—Ronald E. Greigg; Edwin E. Greigg

(57) ABSTRACT

A pump unit with a drive motor mounted onto a pump block which reduces noise problems which stem from clearance fits that are required in order to be able to mount the drive motor onto the pump block. A pump unit set forth eliminates clearance fits required for the perfect assembly of the pump unit by means of plastic introduced into the clearance fits. The pump unit is particularly provided for slip-controlled vehicle brake systems in motor vehicles.

10 Claims, 3 Drawing Sheets

PUMP UNIT FOR A HYDRAULIC BRAKE SYSTEM

CROSS REFERENCE TO A RELATED APPLICATION

This application is a 371 of PCT/DE98/03806 filed Dec. 29, 1998.

BACKGROUND OF THE INVENTION

The invention is based on a pump unit.

A pump unit, which is comprised of a piston pump and a drive motor that drives the piston pump, has already been disclosed by DE 44 30 909 A1 and U.S. Pat. No. 5,564,909. The pump pistons of the piston pump are disposed in a pump block to which the motor housing of the drive motor is flange mounted. A shaft, which is driven by the drive motor and protrudes from the motor housing into the pump block, is used to drive the pump pistons of the piston pump. The motor housing has a projection which protrudes into a recess provided in the pump block. This projection of the motor housing contains a bearing which is supported on the shaft.

In the pump unit disclosed by DE 44 30 909 A1 and U.S. Pat. No. 5,564,909, it is disadvantageous that the bearing forces which arise at the center bearing cannot be optimally absorbed by the motor housing. DE 195 36 794 A1 has disclosed an embodiment which attempts to solve this problem by virtue of the fact that the bearing is built directly into the pump block between the drive motor and the pump pistons. However, this produces considerable technical manufacturing difficulties because with this embodiment, it is not possible to carry out a separate assembly and a possible separate testing of the drive motor before mounting the motor onto the pump block.

It has turned out that the connection, which is not optimally play-free, between the drive motor and the pump block contributes to the generation of noise.

In DE 44 30 909 A1 and U.S. Pat. No. 5,564,909, a radial clearance fit is disposed between the end of the shaft protruding into the pump block and the inner bearing ring of the bearing, there so that it is possible to assemble the components. With this bearing there is also the problem that this clearance fit also contributes to the generation of noise.

Because tolerances and clearance fits cannot be entirely avoided despite extremely high manufacturing precision, unpleasant noise produced by them must be expected.

DE 44 30 909 A1 and U.S. Pat. No. 5,564,909 disclosed pump units in which, the shaft is supported by means of an additional bearing in the motor housing, on the end remote from the pump block. However, the cost of manufacturing this bearing and the considerable space requirement for this bearing have up to now been significant disadvantages.

ADVANTAGES OF THE INVENTION

The pump unit according to the invention has an advantage over the prior art that a considerable reduction of the noise produced by the pump unit and frequently also an improvement in the service life of the pump unit can be achieved at a low manufacturing cost.

The clearance fit can advantageously be generous enough so that the drive motor, together with the shaft, can be very simply connected to the pump block.

Because the motor housing, the shaft, and the at least one bearing contained by the motor housing constitute a preassembled unit, the advantage of a low manufacturing cost and the advantage that when needed, the drive motor, together with the shaft, can be separately tested before being mounted onto the pump block are retained; and the advantage is also attained that the bearing forces of the at least one bearing can be optimally absorbed by the relatively rigid pump block, which results in a considerable degree of noise reduction. Because of the increase in rigidity, it is advantageously possible without risk to reduce the material thicknesses used, in particular the wall thickness of the motor housing or the thickness of the pump block.

Advantageous improvements and updates of the pump unit are possible by means of the measures set forth herein.

Injecting plastic into the clearance fit, which can be made fluid for example by means of heating or which hardens for example by means of a chemical reaction only after the passage of time, attains the advantage that the manufacturing cost as a whole is not significantly increased because it is possible to introduce the plastic with ease.

The first bearing, which is held by the motor housing between the at least one pump piston and the drive motor, absorbs a considerable part of the forces acting on the shaft. Eliminating the radial play at the projection of the motor housing, which protrudes into the recess of the pump block, by means of the introduced plastic, attains the advantage that the significant part of the bearing forces can be absorbed by the pump block, which is of significant importance for the service life of the pump unit and for an effective noise reduction.

Eliminating the clearance fit between the second bearing and the pump block, attains the advantage that the production of unpleasant noise in the vicinity of the second bearing is eliminated or at least sharply reduced.

Since the second bearing can be built into the pump block with a radial clearance fit, the second bearing can be connected to the shaft that protrudes from the motor housing before the drive motor is mounted onto the pump block, which significantly decreases the manufacturing cost in an advantageous manner and significantly increases the testability.

In the vicinity of the first bearing and in the vicinity of the second bearing, if the radial play between these two bearings and the pump block is eliminated by means of the introduced plastic, then the advantage is attained that the noise generation is eliminated or sharply reduced at both bearings.

If the shaft in the motor housing is supported by means of a bearing pin provided on the motor housing, which engages in a bush protruding axially beyond the shaft, then the advantage is attained that the drive motor is made significantly more rigid for a low manufacturing cost and without a noticeable increase in the required installation space. Another advantage is that the shaft does not have to be machined especially for the additional bearing, in particular the end of the shaft oriented toward the additional bearing also does not have to be bored on the end face, which would entail a considerable cost.

The engagement of the bearing pin in the bush attains the additional advantage that the diameter of the additional bearing can be selected as relatively large without this resulting in additional cost for manufacturing or material.

BRIEF DESCRIPTION OF THE DRAWINGS

Preferably selected, particularly advantageous exemplary embodiments of the invention are shown in a simplified fashion in the drawings and will be explained in detail in the subsequent description.

DETAILED DESCRIPTION OF THE INVENTION

The piston pump of the pump unit embodied according to the invention is provided in particular as a pump in a brake system of a vehicle and is used to control the pressure in wheel brake cylinders. The abbreviations ABS, TCS, ESP, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid from a storage tank into a wheel brake cylinder or a plurality of wheel brake cylinders (TCS, ESP, or EHB). The pump is required, for example, in a brake system with wheel slip control (ABS or TCS) and/or a brake system serving as a steering aid (ESP) and/or an electrohydraulic brake system (EHB). With wheel slip control (ABS or TCS), for example, a locking of the wheels of the vehicle during a braking event when there is strong pressure on the brake pedal (ABS) and/or a spinning of the driven wheels of the vehicle when there is strong pressure on the gas pedal (TCS) can be prevented. In a brake system that serves as a steering aid (ESP), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill a reservoir of the brake system.

Figure 1:
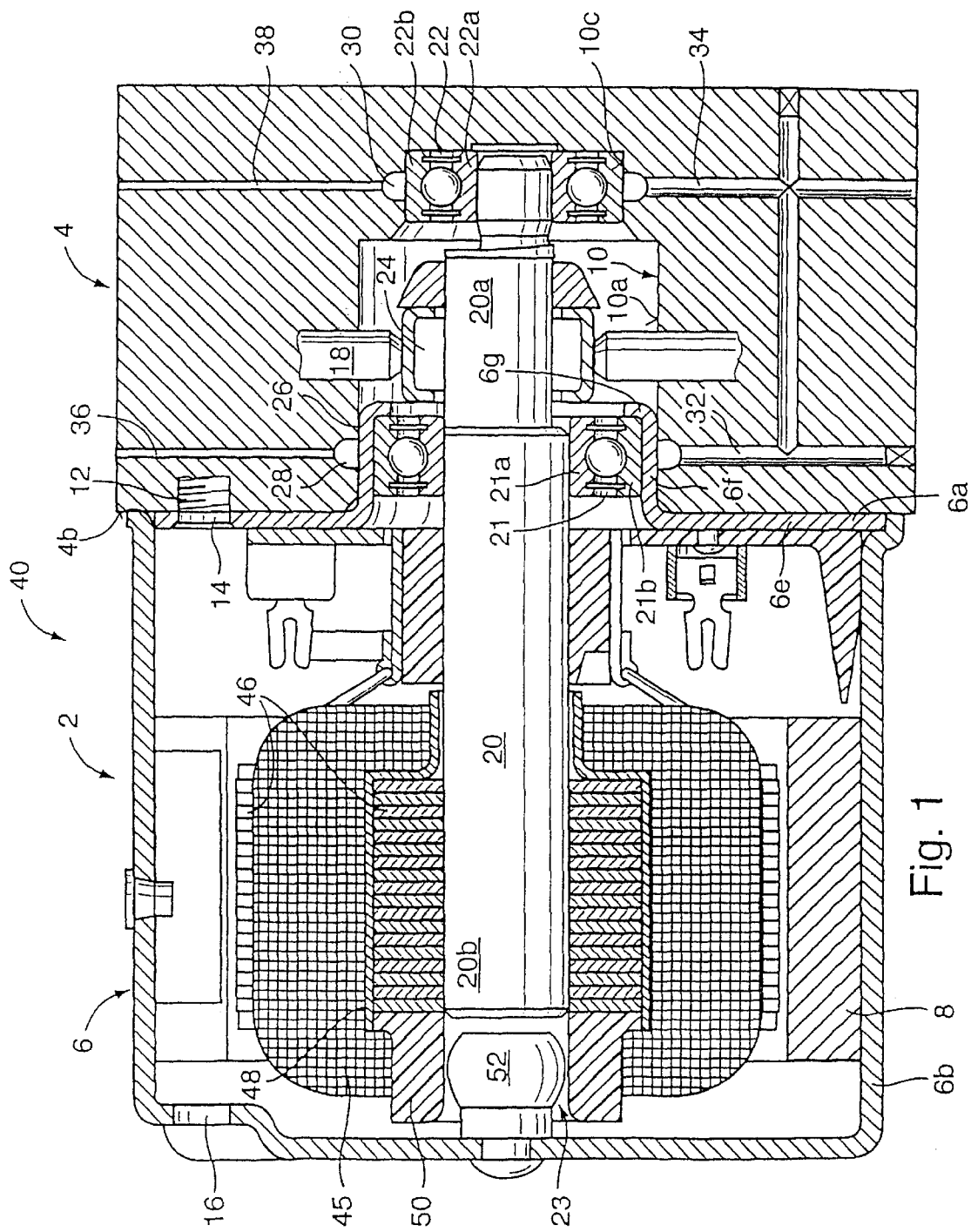
FIG. 1 shows a longitudinal section through a first selected exemplary embodiment.

By way of example, FIG. 1 shows a longitudinal section through a preferably selected pump unit. The pump unit is comprised essentially of an electric drive motor 2 and a pump block 4. The pump unit functions as a piston pump. A motor housing 6 protects the interior of the drive motor 2 against damaging environmental influences and is used to support permanent magnets 8 of the stator of the drive motor 2. In the preferably selected exemplary embodiment, the motor housing 6 is composed of a first motor housing part 6a and a second motor housing part 6b. The second motor housing part 6b is embodied as cup-shaped, with its opening in the direction of the pump block 4. The first motor housing part 6a closes the opening of the cup-shaped second motor housing part 6b oriented toward the pump block 4. In contrast to the graphic representation, it is also possible that the first motor housing part 6a is embodied as cup-shaped, with its opening in the direction away from the pump block 4. In this instance, the for example disk-like second motor housing part 6b would close the cup-shaped first motor housing part 6a.

The pump block 4 has an end face 4b oriented toward the drive motor 2. Starting from the end face 4b, a recess 10 extends in the pump block 4. The recess 10 begins with a larger diameter 10a on the end face 4b and then transitions to a smaller diameter 10c inside the pump block 4.

The pump block 4 is united with the motor housing 6 and to this end, has at least one threaded opening 12 on the end face 4b. This threaded opening 12 is associated with an opening 14 in the motor housing part 6a and an opening 16 in the motor housing part 6b. A screw, not shown, can be slid through the openings 14 and 16, by means of which the electric drive motor 2 and the pump block 4 of the piston pump can be clamped together to form the pump unit.

A guide bush, not shown, is provided in the pump block 4 and a pump piston 18 is supported so that the pump piston can slide in this guide bush. The pump piston 18 can also be supported directly in the pump block 4 so that the guide bush can be eliminated. In addition to at least one pump piston 18, other radially disposed pump pistons 18 can be provided. On the whole, the pump unit has for example two or four pump pistons 18. For the sake of better visibility, only the inwardly directed ends of two pump pistons 18 are shown in the drawing.

A shaft 20 is disposed inside the pump unit. The shaft 20 has a shaft end 20a that protrudes into the pump block 4 and a shaft end 20b that protrudes into the motor housing 6. The motor housing part 6a of the motor housing 6 has an outer region 6e extending radial to the shaft 20, a central region 6f extending axial to the shaft 20, and a narrow inner region 6g extending radial to the shaft 20. A first bearing 21 is provided inside the circumferential central axial region 6f of the motor housing 6. The bearing 21 is supported by the region 6f of the motor housing 6. A rolling bearing, more precisely stated a ball bearing, has been selected for the first bearing 21. The bearing 21 has an inner bearing ring 21a and an outer bearing ring 21b. A second bearing 22 is provided on the end 20a of the shaft 20 that protrudes into the pump block 4. The second bearing 22 is a rolling bearing, more precisely stated a ball bearing, with an inner bearing ring 22a and an outer bearing ring 22b. In the preferably selected exemplary embodiment, another bearing 23 is provided in the vicinity of the shaft end 20b remote from the pump block 4. The additional bearing 23 is preferably a slide bearing.

An eccentric bearing 24 is disposed between the first bearing 21 and the second bearing 22. Between the two bearings 21 and 22, the shaft 20 has a region that extends eccentrically to the longitudinal axis of the shaft 20. The eccentric bearing 24 is disposed on this eccentric region of the shaft 20. The eccentric bearing 24 is a rolling bearing, more precisely stated a roller or needle bearing. The pump pistons 18 are supported against the outer ring of the eccentric bearing 24 and are driven into reciprocating motions when the shaft 20 rotates. The pump pistons 18 give rise to considerable radial forces on the two bearings 21 and 22 by way of the eccentric bearing 24.

The inner ring 21a of the first bearing 21 is pressed firmly onto the shaft 20. The outer ring 21b is pressed firmly into the center axial region 6f of the motor housing 6 until it comes into contact with the inner radial region 6g. The inner ring 22a of the second bearing 22 is pressed firmly onto the shaft 20. Since the bearings 21 and 22 are easily accessible while the bearings 21 and 22 are being pressed onto the shaft 20 and while the bearing 21 is being pressed into the motor housing part 6a, the bearings 21 and 22 can be easily pressed in or pressed on with a simple tool, for example with pressing dies, without having to fear a damage to the bearings 21 and 22 or to another component. The bearings 21 and 22 can be pressed in or pressed on spatially separate from and long before the drive motor 2 is mounted onto the pump block 4.

The central axial region 6f of the motor housing 6 constitutes a circumferential projection 26. The projection 26 extends concentric to the shaft 20. The projection 26 protrudes into the recess 10 of the pump block 4.

In the larger diameter 10a of the recess 10, a circumferential pocket 28 in the form of a circumferential groove is provided in the vicinity of the projection 26. Another circumferential groove, which constitutes another pocket 30, is provided on the smaller diameter 10c of the recess 10 in the vicinity of the outer bearing ring 22b of the bearing 22. A filling connection 32 feeds into the pocket 28. A filling connection 34 also feeds into the other pocket 30. The filling connections 32 and 34 are connected to the surface of the pump block 4 so that a pourable material can be introduced into the pockets 28 and 30 by way of the filling connections 32, 34. Ventilation connections 36 and 38 are provided so that the air can escape from the pockets 28, 30 during the introduction of the pourable material into these pockets 28, 30.

The drive motor 2, the motor housing part 6a or the motor housing 6b, the shaft 20, and the bearing 21 supported by the motor housing 6 constitute a preassembled unit 40, which can be assembled and tested as needed, spatially and chronologically independent of the pump block 4. It is preferable to also mount the second bearing 22 onto the preassembled unit 40 before the preassembled unit 40 is mounted onto the pump block 4. In this instance, the second bearing 22 can be thought of as another component of the preassembled unit 40.

A radial clearance fit 41 (FIG. 2) is provided between the projection 26 and the recess 10 so that the preassembled unit 40 can be easily mounted onto the pump block 4. An additional radial clearance fit 42 (FIG. 3) is provided between the outer circumference of the outer bearing ring 22b of the bearing 22 and the smaller diameter 10c of the recess 10. Because the radial distance or clearance fit 41, between the projection 26 and the pump block 4 and also the radial distance or clearance fit 42 between the bearing 22 and the pump block 4 are difficult to see in the scale chosen for FIG. 1, the region with the radial distance between the projection 26 and the pump block 4 is shown once more in a different scale as a detail in FIG. 2, and the region with the radial distance between the bearing 22 and the pump block 4 is shown once more in a different scale as a detail in FIG. 3.

Figure 2:
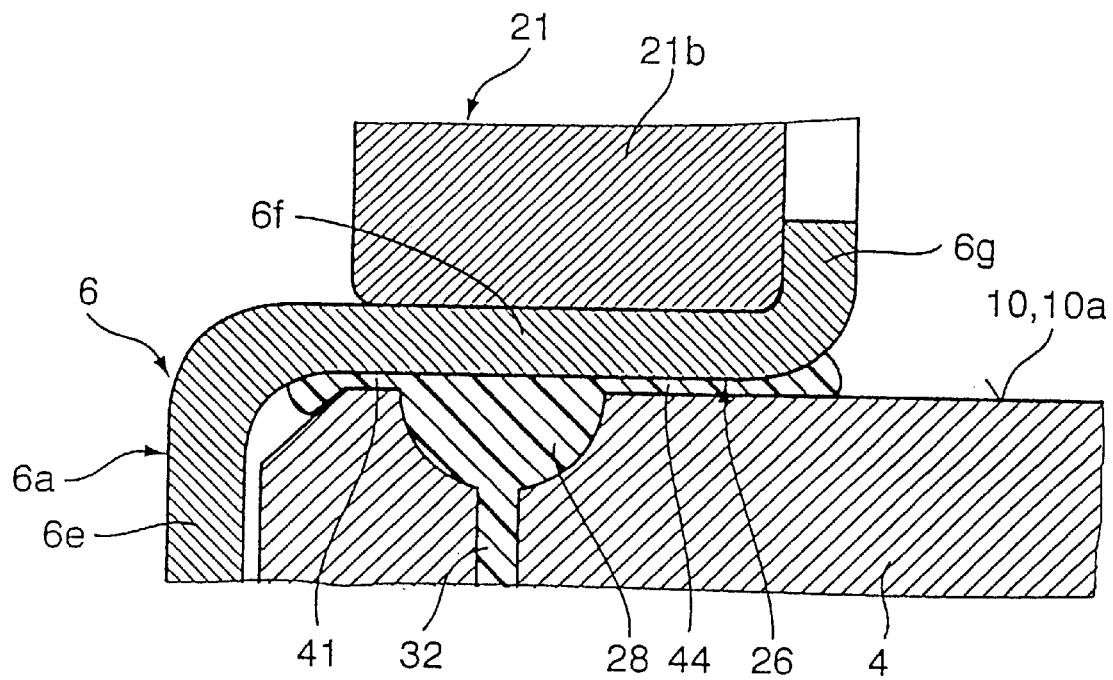
FIG. 2 shows a cross section of a plastic filled radial clearance bit between a projection and a recess for mounting a preassembled unit.
Figure 3:
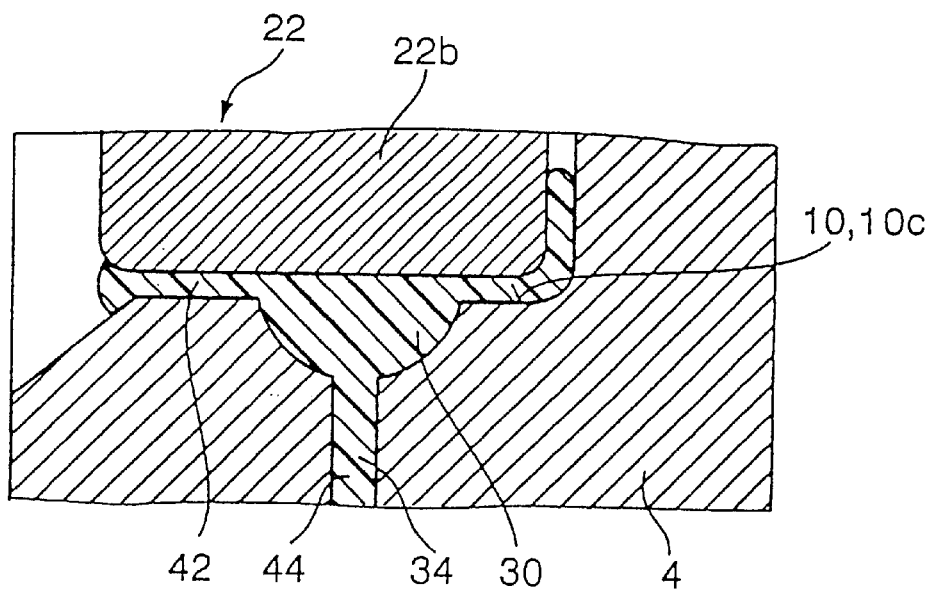
FIG. 3 shows a cross section of plastic filled pockets in greater detail.

FIGS. 2 and 3 show different details.

In all of the Figs., parts that are the same or function in the same manner are provided with same reference numerals. Provided that nothing to the contrary is mentioned or is depicted in the drawings, that which is mentioned and depicted in conjunction with one of the Figs. also applies to the other exemplary embodiments. As long as nothing to the contrary ensues from the explanations, the details of the different exemplary embodiments can be combined with one another.

FIG. 1 shows the pockets 28 and 30 before the pourable material is introduced. FIGS. 2 and 3 show the pockets 28 and 30 and the clearance fits 41, 42 after a plastic 44 has been introduced. The plastic 44, which has been pressed as a pourable material into the pocket 28 by means of the filling connection 32, is distributed inside the pocket 28 essentially over the entire circumference of the projection 26. From the pocket 28, the plastic 44 is pressed into the radial clearance fit 41 between the projection 26 and the pump block 4. Since the plastic 44 has been introduced as a fluid or paste, it hardens, for example, by means of cooling or as a result of a chemical reaction. The projection 26 of the motor housing 6 is therefore embedded firmly and without play in the pump block 4. It is preferable to fill the pockets 28 and 30 with a plastic 44 which does not shrink during its hardening or better still, undergoes a slight volume increase during its hardening. The plastic 44 can also be produced so that it glues the motor housing 6 or the bearing ring 22b to the pump block 4.

As already explained above, because the inner bearing ring 21a of the bearing 21 is connected without play to the shaft 20, and because furthermore, the outer bearing ring 21b is connected without play to the axial region 6f of the motor housing 6, and because the motor housing 6 is firmly or at least tightly connected to the pump block 4 in the vicinity of bearing 21 due to the plastic 44 in the pocket 28 and in the clearance fit 41, a support of the shaft 20 in the vicinity of the bearing 21 is produced that is largely without play in the radial direction, which is evidenced on the whole by the service life and by means of a particularly low noise generation.

As has already been suggested further above in the description, because the inner bearing ring 22a of the second bearing 22 is connected without play to the shaft 20 and because the outer bearing ring 22b is also embedded without play in the pump block 4 due to the plastic 44 in the pocket 30 and in the clearance fit 42, the shaft 20 is also supported without play in the vicinity of the second bearing 22, which is also positively evidenced here by means of a service life that is good on the whole and by means of a particularly low noise generation.

A rotor of the electric drive motor 2 is disposed on the shaft 20 and inside the motor housing 4. The rotor is essentially comprised of a coil 45, which is wound out of insulated copper wire, and a plate stack 46, which is open toward the outside and is used as an armature. The plate stack 46 is comprised of stamped plates disposed one above the other in layers. As a protection for the coil 45, a plastic insulation 48 is usually provided between the plate stack 46 and the coil 45. In the preferably selected exemplary embodiment, the plastic insulation 48 also extends in the axial direction beyond the shaft end 20b remote from the pump block 4. The region of the plastic insulation 48 protruding axially beyond the shaft 20 has the form of a bush 50. The bush 50 and the remaining region of the plastic insulation 48 are preferably cast or injection molded together in a common mold. The bush 50 and the remaining region of the plastic insulation 48 are therefore a single, coherent component that can be formed in one work cycle. However, the bush 50 and the remaining region of the plastic insulation 48 can also be two separately formed components made of plastic which are joined together.

A bearing pin 52 is riveted, screwed, or welded to the bottom center of the cup-shaped motor housing part 6b. The outer diameter of the bearing pin 52 is ball-shaped and fits with a small amount of bearing play into the inner diameter of the bush 50. The ball shape of the bearing pin 52 assures that the shaft 20 can be angularly aligned in relation to the motor housing 4 so that problems, in particular jamming, cannot occur in the vicinity of the additional bearing 23.

Figure 4:
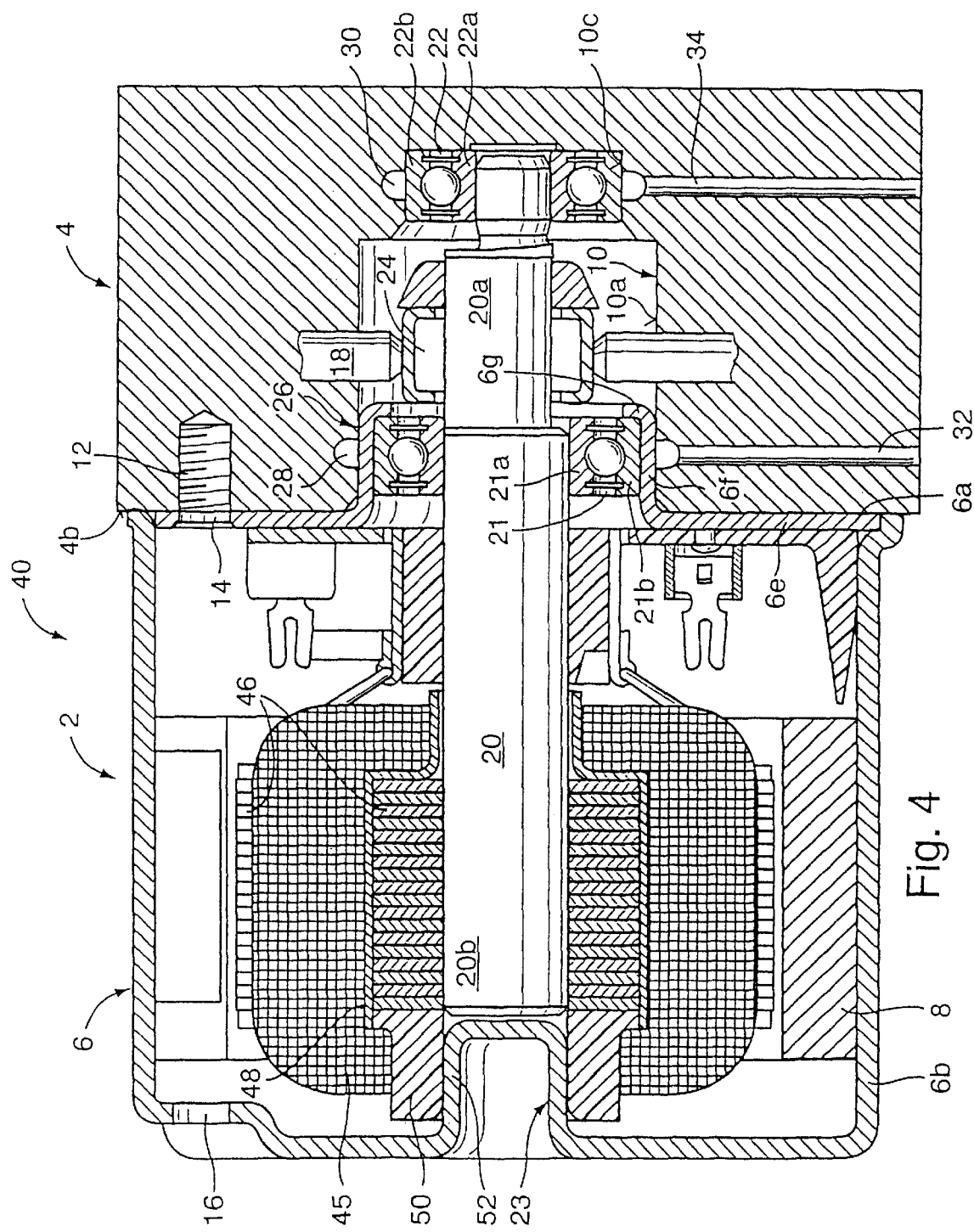
FIG. 4 shows a longitudinal section through another selected exemplary embodiment.

FIG. 4 shows another selected, particularly advantageous exemplary embodiment.

In the exemplary embodiment shown in FIG. 4, the bearing pin 52 of the additional bearing 23 is formed in such a way that the motor housing part 6b of the motor housing 6 has an inwardly directed indentation in the bottom center, concentric to the shaft 20. As shown in FIG. 4, the bearing pin 52 can be formed directly onto the motor housing 6 by means of a corresponding shaping when stamping or deep drawing the motor housing 6. It should also be emphasized that the inner diameter of the bush 50 of the bearing 23 can also be greater than the outer diameter of the shaft 20, which has a positive effect on the stability of the additional bearing 23, particularly on the stability of the bearing pin 52.

As shown in FIG. 4, the filling connections 32 and 34 can each be separately accessed from the outside so that the two pockets 28 and 30 can be filled with the plastic 44 independently of each other. However, as shown in FIG. 1, it is also possible to connect the two filling connections 32 and 34 to each other inside the pump block 4 so that fewer connections have to be connected in order to fill the pockets 28 and 30. In the exemplary embodiment shown in FIG. 4, the ventilation connections 36 and 38 according to FIG. 1 have been eliminated, which is possible depending on the dimensions of the pockets 28, 30 and the radial clearance fits 41 and 42.

Because of the radial clearance fits 41 and 42 in the vicinity of the bearings 21 and 22, which are eliminated by means of the introduced plastic 44 after the assembly, an optimal alignment of the shaft 20 is produced without having to fear an increased load on the shaft 20 or even a bending of the shaft 20 due to the three-point support of the shaft 20.

Because the two clearance fits 41 and 42 are eliminated by the plastic 44, the two clearance fits 41 and 42 can have very large dimensions, which means that significantly less precise measurement tolerances have to be maintained in the manufacture of the parts than was previously the case; and because of the large radial clearance fits 41 and 42 between the preassembled unit 40 and the pump block 4, the mounting of the preassembled unit 40 onto the pump block 4 can take place with great ease.

It is preferable to provide a sufficiently large radial clearance fit 41 and 42, both in the vicinity of the bearing 21 and in the vicinity of the bearing 22, which is then eliminated after the preassembled unit 40 is mounted onto the pump block 4 by means of introducing the plastic 44 because then, the best effect with regard to noise reduction and ease of mounting the motor housing 6 onto the pump block 4 is achieved. However, it should be mentioned that even if the radial clearance fit 41, which is then eliminated with the plastic 44, is provided only in the vicinity of the first bearing 21 between the projection 26 and the pump block 4, i.e. that the outer bearing ring 22b of the bearing 22 is press-fitted into the pump block 4, in regard to the desired noise reduction and in regard to the ease of mounting the drive motor onto the pump block 4, an improvement can likewise be achieved which is, however, hardly as great as when the radial clearance fits 41 and 42, which are eliminated by means of the plastic 44, are provided in the vicinity of both bearings 21 and 22. On the other hand, even if the radial clearance fit 42, which is eliminated with the plastic 44 after assembly, is provided only in the vicinity of the second bearing 22, wherein the projection 26 is embodied in the same manner as in previously disclosed pump units, i.e. that in the vicinity of the projection 26 no clearance compensation is carried out by means of introduced plastic, an improvement with regard to service life and/or noise reduction can likewise be achieved, which is, however, hardly as noticeable as when the radial clearance fits 41 and 42, which are subsequently eliminated with the plastic 44, are provided in the vicinity of both bearings 21 and 22.

The foregoing relates to a preferred exemplary embodiments of the invention, it being understood that other variants and embodiments thereof are possible within the spirit and scope of the invention, the latter being defined by the appended claims.

What is claimed is:

1. A pump unit comprising a piston pump with at least one pump piston in a pump block (4) and a motor housing part that is secured onto the pump block (4) and is a part of a motor housing (6) for a drive motor (2), a shaft (20) that is driven by the drive motor (2), the shaft drives at least one pump piston, wherein the shaft (20) is supported by first and second bearings (21, 22), with the first bearing (21) being contained by the motor housing part (6, 6a), the drive motor (2), the motor housing part (6, 6a), the shaft (20), and the first and second bearings (21) constitute a preassembled unit (40), which is mounted onto the pump block (4) with first and second radial clearance fits (41, 42), wherein after the preassembled unit (40) is mounted onto the pump block (4), the first and second radial clearance fits (41, 42) are eliminated by introduction of a plastic (44) into the first and second clearance fits (41, 42), in a vicinity of the first bearing (21), the motor housing part (6, 6a) constitutes a projection (6f, 26) that engages in a recess (10, 10a) provided in the pump block (4), wherein the first radial clearance fit (41) eliminated by the introduced plastic (44) is provided between the projection (6f, 26) and the recess (10, 10a), and the first and second radial clearance fits (41 and 42), which are eliminated by the introduced plastic (44), are respectively provided between the projection (6f, 26) on the motor housing part (6, 6a) and the recess (10, 10a) in the pump block (4) and between the second bearing (22, 22b) and the pump block (4).

2. The pump unit according to claim 1, in which the first bearing (21) is a rolling bearing (21, 21a, 21b) press-fitted between the motor housing part (6, 6a) and the shaft (20).

3. The pump unit according to claim 1, in which the second bearing (22) is a rolling bearing (22, 22a, 22b) that is press-fitted onto the shaft (20).

4. The pump unit according to claim 1, in which the shaft (20) is supported on the motor housing (6, 6b) by an additional bearing (23), wherein the additional bearing (23) is embodied in such a way that a bearing pin (52) is provided on the motor housing (6, 6b) and engages in a bush (48, 50) that is attached to the shaft (20) and protrudes axially beyond the shaft (20).

5. The pump unit according to claim 4, in which the bearing pin (52) is constituted by a bolt attached to the motor housing (6, 6b).

6. The pump unit according to claim 4, in which the bearing pin (52) is mounted onto the motor housing (6, 6b).

7. A pump unit comprising a piston pump with at least one pump piston in a pump block (4) and a motor housing part that is secured onto the pump block (4) and is a part of a motor housing (6) for a drive motor (2), a shaft (20) that is driven by the drive motor (2), the shaft drives at least one pump piston, wherein the shaft (20) is supported by at least a first bearing (21, 22) contained by the motor housing part (6, 6a), the drive motor (2), the motor housing part (6, 6a), the shaft (20), and the at least first bearing (21) constitute a preassembled unit (40), which is secured onto the pump block (4) with first and second radial clearance fits (41, 42), wherein after the preassembled unit (40) is secured onto the pump block (4), the first and second radial clearance fits (41, 42) are eliminated by introduction of a plastic (44) into the first and second clearance fits (41, 42), the shaft (20) is supported by a second bearing (22) contained by the pump block (4), wherein the second radial clearance fit (42) eliminated by an introduced plastic (44) is provided between the second bearing (22, 22b) and the pump block (4), the first and second radial clearance fits (41 and 42), which are eliminated by the introduced plastic (44), are respectively provided between the projection (6f, 26) on the motor housing part (6, 6a) and the recess (10, 10a) in the pump block (4) and between the second bearing (22, 22b) and the pump block (4).

8. The pump unit according to claim 7, in which the first bearing (21) is a rolling bearing (21, 21a, 21b) press-fitted between the motor housing part (6, 6a) and the shaft (20).

9. The pump unit according to claim 7, in which the second bearing (22) is a rolling bearing (22, 22a, 22b) that is press-fitted onto the shaft (20).

10. The pump unit according to claim 7, in which the shaft (20) is supported on the motor housing (6, 6b) by an additional bearing (23), wherein the additional bearing (23) is embodied in such a way that a bearing pin (52) is provided on the motor housing (6, 6b) and engages in a bush (48, 50) that is attached to the shaft (20) and protrudes axially beyond the shaft (20).

* * * * *

UNITED STATES PATENT AND TRADEMARK OFFICE
CERTIFICATE OF CORRECTION

PATENT NO. : 6,196,812 B1
DATED : March 06, 2001
INVENTOR(S) : Heinz Seigel

It is certified that error appears in the above-identified patent and that said Letters Patent is hereby corrected as shown below:

The title page item (54) should read as follows:

(54) PUMP UNIT FOR A HYDRAULIC BRAKE SYSTEM WITH A PLASTIC INJECTED ADJACENT TO THE BEARINGS

Signed and Sealed this

Twelfth Day of June, 2001

*Attest:*

NICHOLAS P. GODICI
*Attesting Officer*  *Acting Director of the United States Patent and Trademark Office*